Patented Apr. 25, 1933

1,906,112

UNITED STATES PATENT OFFICE

ROBERT L. SIBLEY, OF NITRO, WEST VIRGINIA, ASSIGNOR TO THE RUBBER SERVICE LABORATORIES COMPANY, OF AKRON, OHIO, A CORPORATION OF OHIO

MANUFACTURE OF MERCAPTOARYLTHIAZOLES

No Drawing.   Application filed June 8, 1931.   Serial No. 543,009.

The present invention relates to the art of manufacturing mercaptoarylthiazoles by a new process, which comprises heating a diarylthiourea, carbon bisulfide, and a chloride of sulfur under pressure greater than atmospheric pressure in the manner hereinafter described. The mercaptoarylthiazoles, as is well known, are valuable accelerators in the rubber vulcanization process.

One method of carrying out the invention, whereby mercaptobenzothiazole is produced, comprises the following: Substantially equal molecular proportions of thiocarbanilide, carbon bisulfide, and sulfur dichloride were placed in an autoclave, or other suitable container constructed of heavy materials to withstand high pressures, and, after tightly closing the reaction vessel, were heated to a temperature of approximately 245 to 255° C., under a pressure greater than atmospheric pressure and preferably under a pressure of substantially 500 to 700 pounds per square inch. The heating at the temperature stated was continued for approximately three hours. After cooling and opening the reaction vessel, the product obtained was extracted with a suitable alkaline solution, for example, an aqueous solution of sodium hydroxide, which removed the mercaptobenzothiazole produced in the form of its sodium salt. The mercaptobenzothiazole was then precipitated from this solution by means of an acid, for example, hydrochloric acid, and washed until free of impurities.

Mercaptobenzothiazole was also prepared by heating, under a pressure greater than atmospheric pressure, substantially one molecular proportion of thiocarbanilide, substantially one molecular proportion of carbon bisulfide and a slight excess over one molecular proportion of sulfur monochloride in a manner analogous to that described above and isolating the product also in a manner analogous to that described above.

Other methods of operating the present invention have been carried out in which other proportions of ingredients than those hereinbefore set forth have been employed.

By operating in a manner analogous to that described above other mercaptoarylthiazoles, as for example mercaptotolylthiazole and mercaptoxylylthiazole, may be prepared from a diarylthiourea, carbon bisulfide and a sulfur chloride.

The examples hereinbefore set forth are to be considered as illustrative only and not at all limitative of the scope of the present invention, which is limited solely by the following claims.

What is claimed is:

1. The process for the preparation of a mercaptobenzothiazole comprising the reaction under the addition of heat between a diphenylthiourea, carbon bisulfide and a sulfur chloride under super-atmospheric pressure.

2. The process for the preparation of a mercaptobenzothiazole comprising the reaction under the addition of heat between a diphenylthiourea, carbon bisulfide and a sulfur chloride under a pressure of substantially 500 to 700 pounds per square inch.

3. The process for the preparation of mercaptobenzothiazole comprising the reaction under the addition of heat between thiocarbanilide, carbon bisulfide and a sulfur chloride under a pressure of 500 to 700 pounds per square inch.

4. The process for the preparation of mercaptobenzothiazole comprising the reaction between thiocarbanilide, carbon bisulfide and a sulfur chloride under a pressure of 600 to 700 pounds per square inch and at a temperature of 240 to 260° C.

5. The process for the preparation of mercaptobenzothiazole comprising the reaction between thiocarbanilide, carbon bisulfide and sulfur dichloride under a pressure of 600 to 700 pounds per square inch and at a temperature of 240 to 260° C.

6. The process for the preparation of mercaptobenzothiazole comprising the reaction between substantially equal molecular proportions of thiocarbanilide, carbon bisulfide and sulfur dichloride under a pressure of 600 to 700 pounds per square inch and at a temperature of 240 to 260° C.

7. The process for the preparation of mercaptobenzothiazole comprising the reaction under the addition of heat between thiocarbanilide, carbon bisulfide and a sulfur chloride under super-atmospheric pressure.

In testimony whereof I hereunto affix my signature.

ROBERT L. SIBLEY.